US007177791B1

(12) United States Patent
Crandall et al.

(10) Patent No.: US 7,177,791 B1
(45) Date of Patent: Feb. 13, 2007

(54) OFFLINE EMULATED INPUT/OUTPUT PROCESSOR DEBUGGER

(75) Inventors: Carl R. Crandall, Hugo, MN (US); Craig B. Johnson, Shoreview, MN (US); Mitch M. Maurer, Brooklyn Park, MN (US); Yonghe Liu, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 597 days.

(21) Appl. No.: 10/729,537

(22) Filed: Dec. 5, 2003

(51) Int. Cl.
    *G06F 9/455* (2006.01)

(52) U.S. Cl. ............................. 703/25; 703/26; 703/27; 714/28; 714/35

(58) Field of Classification Search .................. 703/23, 703/24, 25, 26, 27; 714/25, 28, 35, 37, 43; 710/1, 62; 707/205; 455/412
    See application file for complete search history.

(56) References Cited

U.S. PATENT DOCUMENTS

| 4,920,481 | A | * | 4/1990 | Binkley et al. | ................ | 703/26 |
| 5,062,042 | A | * | 10/1991 | Binkley et al. | ............. | 707/205 |
| 5,088,033 | A | * | 2/1992 | Binkley et al. | ................ | 703/24 |
| 5,819,063 | A | * | 10/1998 | Dahl et al. | ...................... | 703/27 |
| 5,949,985 | A | * | 9/1999 | Dahl et al. | ...................... | 703/26 |
| 6,128,679 | A | * | 10/2000 | Beale et al. | ................... | 710/62 |
| 6,421,742 | B1 | * | 7/2002 | Tillier | ............................. | 710/1 |

| 2002/0168966 | A1 | * | 11/2002 | Tillier | ......................... | 455/412 |

OTHER PUBLICATIONS

Oly et al., J. Markov Model Prediction of I/O Requests for Scientific Applications, Proceedings of the 16th International Conference on Supercomputing, ACM Press, Jun. 2002, pp. 147-155.*
Zheng et al., C. PA-RISC to IA-64: Transparent Execution, No Recompilation, IEEE, Computer, vol. 33, No. 3, Mar. 2000, pp. 47-52.*
Bose et al., P. Performance Analysis and Its Impact on Design, IEEE, Computer, vol. 31, No. 5, May 1988, pp. 41-49.*

* cited by examiner

*Primary Examiner*—Russell Frejd
(74) *Attorney, Agent, or Firm*—Charles A. Johnson; Mark T. Starr; Crawford Maunu, PLLC

(57) ABSTRACT

The various embodiments of the invention relate to analyzing operations of an emulated input-output processor. Instructions native to the first type of instruction processor are emulated on a second-type instruction processor. The instruction processor emulator executes an operating system that includes instructions native to the first type of instruction processor. The operating system includes instructions that write input/output (IO) requests to the memory arrangement in response to IO functions invoked by a program. An IOP emulator that is executable on the second-type processor emulates IOP processing of IO requests from the memory arrangement. The IOP emulator maintains in the memory arrangement a first set of data structures used in processing the IO requests. State data currently contained in the data structures is stored on a retentive storage device, and in response to user input controls, the state data is read from retentive storage and displayed.

19 Claims, 9 Drawing Sheets

OFFLINE EMULATED INPUT/OUTPUT PROCESSOR DEBUGGER

FIELD OF THE INVENTION

The present disclosure relates to debugging in an emulated data processing system.

BACKGROUND OF THE INVENTION

Data processing systems, such as the 2200 series systems from Unisys, include one or more instruction processors, a memory arrangement, and one or more input/output processors (IOP) that handle IO requests for input or output of data for the system. IO requests reference data that is input or output on IO channels such as SCSI, fiber, or a via a network, for example.

In the course of developing a system and bringing the system to market, various tests are performed in an attempt to ensure that the system functions according to specifications. Problems may be identified by comparing data generated by the system in running a test to expected result data. If a problem is detected, further testing may be performed to identify the source of the problem. In performing the further testing additional data may be gathered at various times during the course of the testing for analysis. This "debug data" may be useful in tracing operations performed by the system, ruling out possible problem sources, and eventually isolating the problem source.

Gathering IOP-related debug data may be inconvenient because the IOP has traditionally been implemented as a IC arrangement. For example, IOP monitoring may require a hardwired connection to the circuitry of the IOP. Also, an IOP being micro-code driven would require code that generates debug data along with the code that implements the mainline processing of the IOP. A method and apparatus that addresses these and related issues would therefore be desirable.

SUMMARY OF THE INVENTION

The various embodiments of the invention relate to analyzing operations of an emulated input-output processor. Instructions native to the first type of instruction processor are emulated on a second-type instruction processor. The instruction processor emulator executes an operating system that includes instructions native to the first type of instruction processor. The operating system includes instructions that write input/output (IO) requests to the memory arrangement in response to IO functions invoked by a program. An IOP emulator that is executable on the second-type processor emulates IOP processing of IO requests from the memory arrangement. The IOP emulator maintains in the memory arrangement a first set of data structures used in processing the IO requests. State data currently contained in the data structures is stored on a retentive storage device, and in response to user input controls, the state data is read from retentive storage and displayed.

In various embodiments, an apparatus is provided for analyzing operations of an emulated input-output processor. The apparatus includes means for emulating instructions native to the first type of instruction processor on a second-type instruction processor. The instructions include operating system instructions that write input/output (IO) requests to the memory arrangement in response to IO functions invoked by a program. Emulation of IOP processing of IO requests is provided by an IOP-emulation means. The IOP emulation means processes IO requests from the memory arrangement and maintains in the memory arrangement a first set of data structures used in processing the IO requests. A means for storing state data currently contained in the data structures on a retentive storage device supports capture of current state information for subsequent viewing by a means for reading state data from retentive storage and displaying the data.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The various embodiments of the invention support viewing in near real-time data associated with processing of IO requests by an emulated input/output processor (IOP). A debugger tool has access to the memory used by the emulated IOP in processing IO requests. The tool may be used to provide a user with a view of trace information gathered in processing the request, cache statistics, and the contents of structures used in managing the IO requests.

Figure 1:
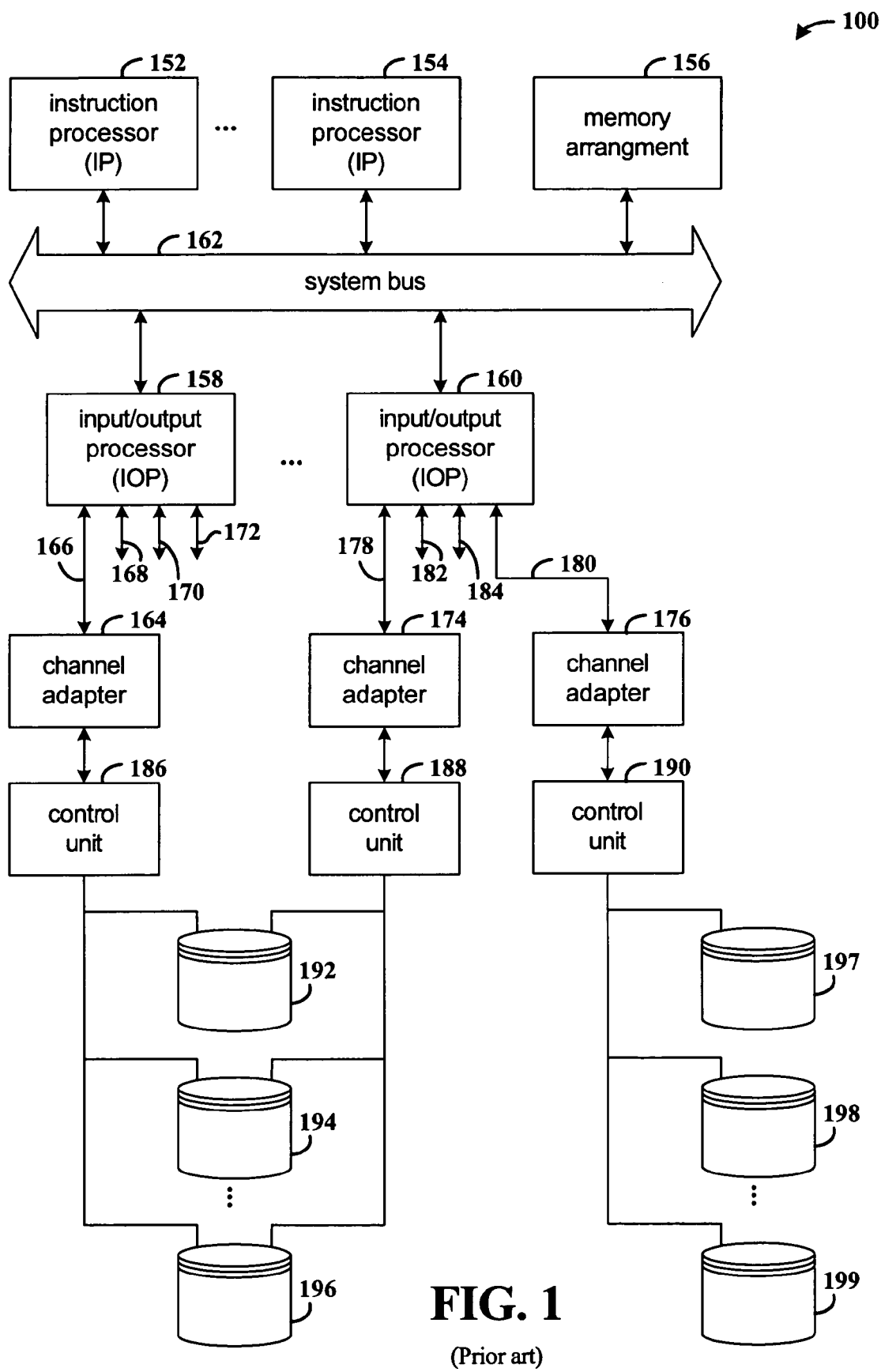
FIG. 1 is an example of a data processing system architecture that includes input/output processors.

FIG. 1 is an example of a data processing system architecture 100 that includes input/output processors. A system built according to architecture 100 is the 2200 series data processing system that is available from Unisys Corporation. The system may be configured with multiple instruction processors 152 and 154, a memory arrangement 156, and multiple input/output processors (IOPs) 158 and 160, coupled to system bus 162. Software executing on the instruction processors may initiate input/output (I/O) requests to the IOPs. The IOPs control the flow of data input to and output from the system and have access to the memory 156.

Each of the IOPs may have multiple ports to accommodate multiple I/O channels. Channel adapter 164 is coupled to IOP 158 via line 166. Lines 168, 170, and 172 are shown to illustrate the availability of additional IO channels. IOP 160 is shown as being coupled to two channel adapters, 174 and 176, via lines 178 and 180, respectively. Lines 182 and 184 illustrate the additional channels available on IOP 160. A channel adapter provides an interface for an IOP to devices accessible according to a specific protocol, such as Block Multiplexed ("Block Mux" that is available from Unisys) or SCSI. The example channel adapters illustrate Block Mux channels. Other types of channels may be configured in the system.

Each of the channel adapters 164, 174, and 176 is coupled to its respective control unit, 186, 188, and 190, and each control unit provides access to its respective string of disks. For example, control units 186 and 188 both provide access to disks 192, 194, and 196. Thus, disks 192, 194, and 196 are accessible via IOP 158 in combination with channel adapter 164, and accessible via IOP 160 in combination with channel adapter 174. Control unit 190 provides access to disks 197, 198, and 199.

Figure 2A:
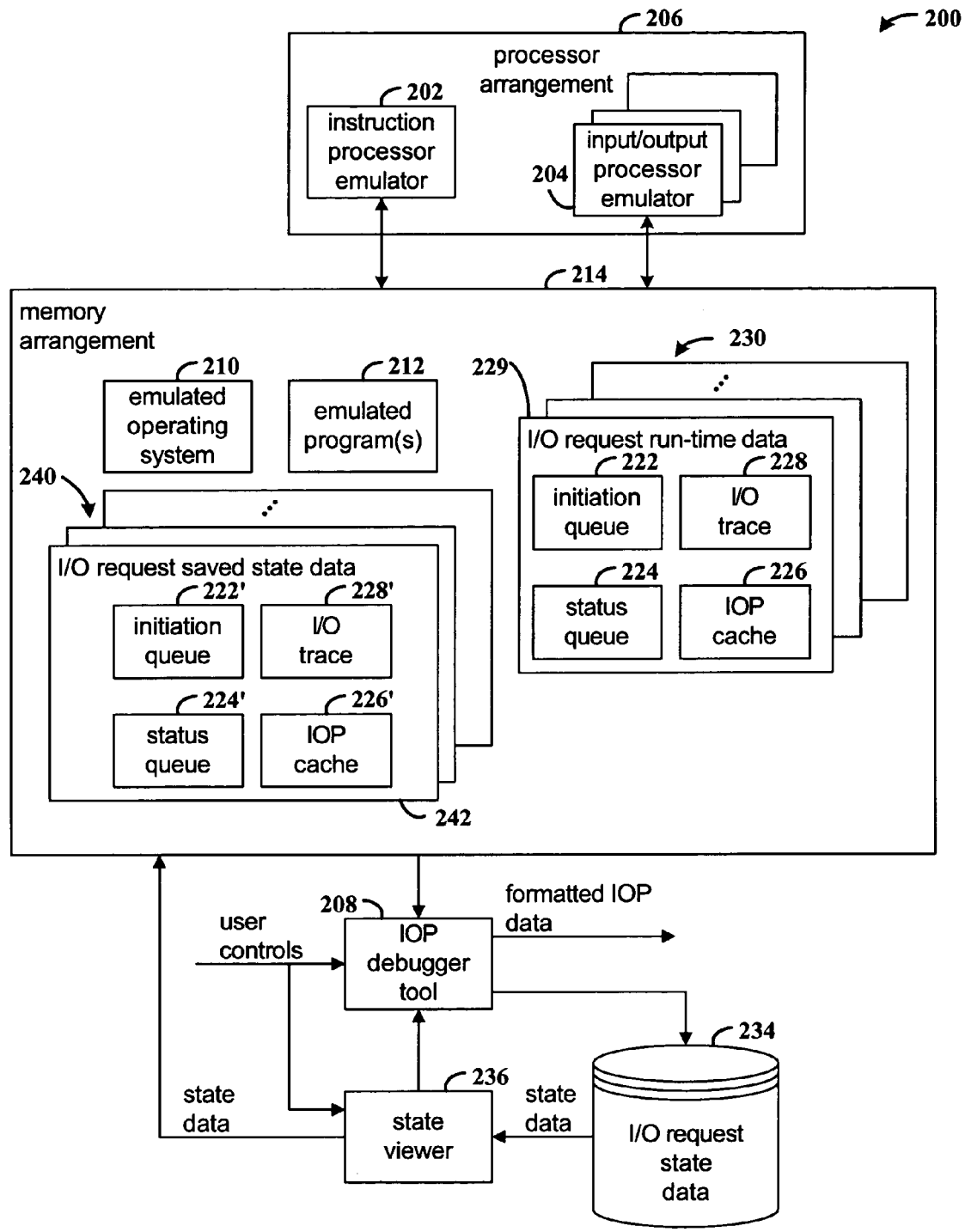
FIG. 2A is a functional block diagram that illustrates an example of an emulation arrangement and associated components for viewing saved emulation state data in accordance with various embodiments of the invention.

FIG. 2A is a functional block diagram that illustrates an example of an emulation arrangement 200 and associated components for viewing saved emulation I/O request state data in accordance with various embodiments of the invention. The emulation arrangement 200 is configured to emulate a data processing system such as system 100 of FIG. 1. The instruction processor emulator 202 and input/output processor (IOP) emulator 204 may be implemented as programs hosted by a processor arrangement 206 such as a CPU or other integrated circuitry configured to function as a processor, for example. The structures used in managing and processing IO requests, as well as the content of IO requests may be viewed via an IOP debugger tool 208.

The instruction processor emulator 202 emulates an instruction processor such as an instruction processor 152 of FIG. 1. It will be appreciated that various known or specially adapted systems may be used to implement an emulator such as instruction processor emulator 202. The emulated operating system 210 is that for controlling operations of system 100 (FIG. 1), for example, and both the emulated operating system and emulated programs 212 are comprised of instructions native to the instruction processor 152. The emulated operating system and emulated programs may be available for execution from a memory arrangement 214 that is coupled to processor arrangement 206. The particular implementation of processor arrangement 206 and memory arrangement 214 may depend on user requirements and other factors. For example, for some implementations micro-processor arrangement running a version of the Windows operating system may be sufficient to host the emulators, and for other applications a more powerful host arrangement may be needed.

Each IOP emulator 204 emulates the functions of an IOP of system 100, for example. The IOP emulator uses the memory to manage the processing of IO requests. Various data structures, such as initiation and status queues 222 and 224, respectively, a cache 226, and IO trace information 228 are used in managing IO requests. Collectively, the initiation queue 222, status queue 224, IOP cache 226, and I/O trace may be referred to as I/O request run-time data 229. In one embodiment, multiple IOP emulators may be instantiated to emulate multiple IOPs of a system. Each IOP emulator maintains its own set (e.g., I/O request run-time data 229) of structures in memory arrangement 214 for processing IO requests directed to that IOP emulator.

IOP debugger tool 208 is available to a user to view the initiation queue 222, status queue 224, cache 226, and IO trace 228. In one embodiment, for example, the IOP debugger tool receives input controls from a user and formats and displays the aforementioned IOP emulator data. The IOP debugger tool may be implemented as an executable program with memory access privileges to the memory areas in which the IOP emulator data is stored.

Figure 2B:
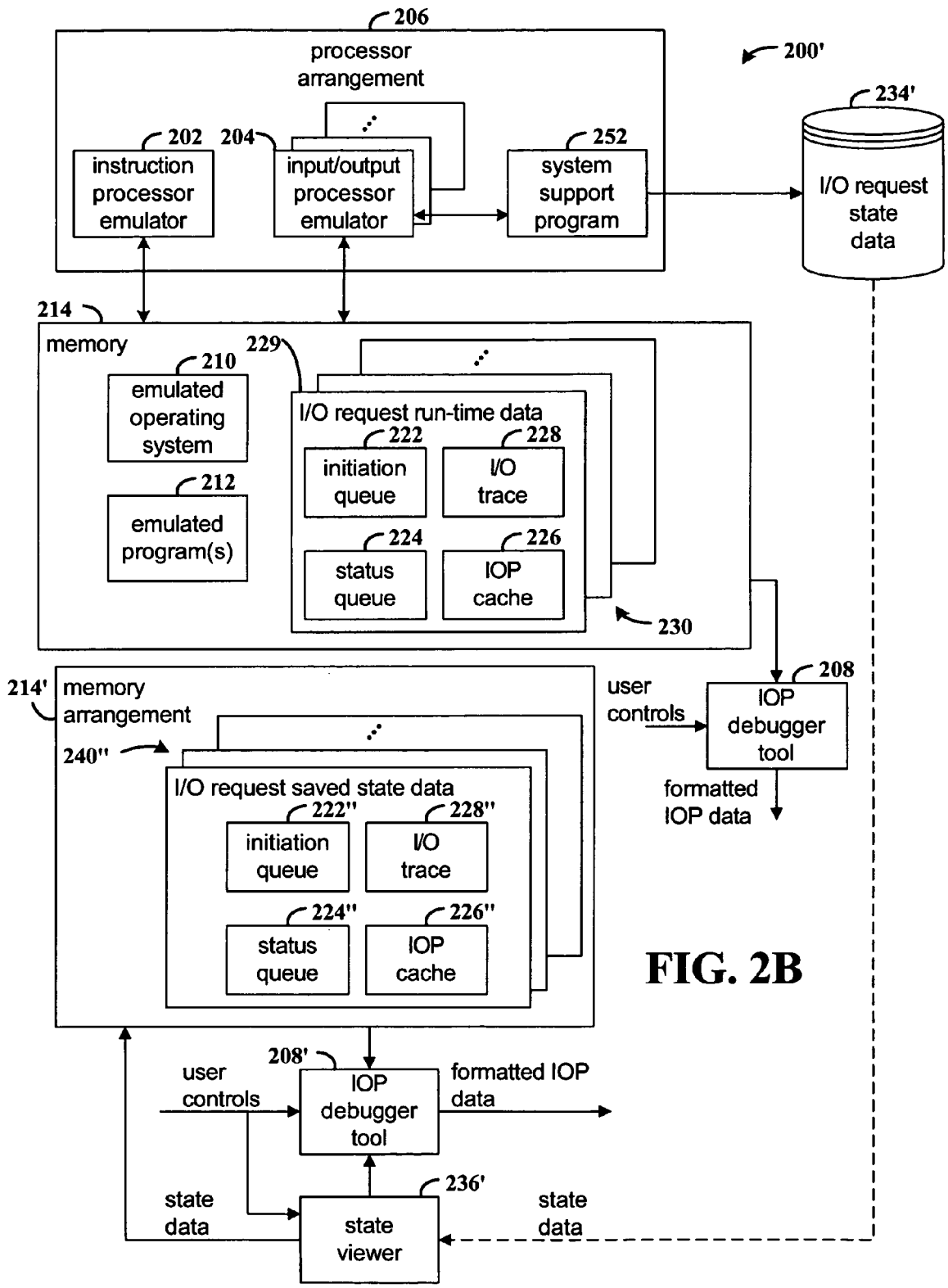
FIG. 2B is a functional block diagram that illustrates an example of an emulation arrangement and an alternative arrangement of components for viewing saved emulation state data in accordance with various embodiments of the invention.

In one embodiment, the IOP debugger tool 208 saves for subsequent viewing the current information from the sets 230 of I/O request run-time data. The current information ("state data") includes the data that presently populates the data structures used in IOP emulation. For example, the state data includes the contents of the initiation queue 222, status queue 224, IOP cache 226, and I/O trace 228. Another embodiment is illustrated in FIG. 2B in which another tool saves the current run-time data.

The current I/O request run-time data sets 230 may be stored as I/O request state data 234 in retentive storage. Suitable retentive storage devices may include fixed or portable magnetic disks, optical disks, flash memory or other media for which the integrity of the data may be preserved independent of rebooting the emulation arrangement 200. The I/O request state data may be stored in any format that is convenient for efficient storage and retrieval.

The state viewer 236, in response to input user controls, reads the I/O request state data 234 from retentive storage and writes the state data to memory arrangement 214 as data sets 240. Data sets 240 use the same types of data structures as are used for the sets 230 of I/O request run-time data, whereby the data in each of sets 230 is formatted the same as the data in each of sets 240. Each set of I/O request saved state data, for example, data set 242, includes data for initiation queue 222', status queue 224', IOP cache 226', and I/O trace 228'. Initiation queue 222' contains state data stored from an initiation queue, for example, initiation queue 222, from the I/O request run-time data sets 230. Status queue 224', IOP cache 226', and I/O trace 228' similarly contain state data from a corresponding one of the I/O request run-time data sets 230. Using the same types of data structures for the I/O request saved state data as are used for the I/O request runtime data permits the same IOP debugger tool to be used for viewing both the run-time data and state data. In one embodiment, the state viewer 236 calls on the IOP debugger tool to provide the user interface for displaying I/O request saved state data.

IOP debugger tool 208 and state viewer 236 may be hosted by processor arrangement 206 or a separate processor arrangement that is coupled to memory arrangement 214.

FIG. 2B is a functional block diagram that illustrates an example of an emulation arrangement 200' and an alternative arrangement of components for viewing saved emulation state data in accordance with various embodiments of the invention. The arrangement 200 generally differs from the emulation arrangement 200' in the manner in which storage of the current I/O request state information is initiated and the separate computing platforms that host the emulation components versus hosting of the data used by the debugger tool 208' and state viewer 236'.

Emulation arrangement 200' includes a system support program 252. The system support program 252 provides control over the IOP emulators 204, instruction processor emulator 202, as well as over the emulated operating system 210. For example, the system support program calls the IP and IOP emulators to boot, stop, save state data, disable devices and other miscellaneous functions.

System support program 252 calls an IOP processor emulator 204 to return the current I/O request run-time data, for example data set 229, when a problem is detected with an IOP emulator or in another part of the system. For example, when an exception is taken in the IOP emulator 204, an exception handler (not shown) will report to the system support program 252 that an error has occurred. If a non-recoverable device error (lost access, etc.) occurs, the IOP emulator 204 will notify the emulated operating system 210 to disable the device. An operator may save the state of the I/O request run-time data 229 in order to preserve information that may be relevant to a possible IOP problem. In another example, if the emulated operating system 210 receives a bad status on an IO request, the operating system may stop emulation after saving state information for the emulated operating system and the I/O request run-time data. Saving the state of the operating system in combination with saving the state of I/O request run-time data may be necessary to determine the source of a problem.

Generally, the state information saved will be in relation to a single IOP emulator 204. However, because there may be multiple paths to a device through multiple IOP emulators, the system support program 252 may save the I/O request run-time data 230 of multiple IOP emulators when a problem occurs in accessing a device.

The IOP emulator returns the current data, and the system support program stores the data as I/O request state data 234' in retentive storage. The retentive storage may then be transported to another site or system, or made accessible, for example, by way of network access, for remote or subsequent viewing.

As with the embodiments of FIG. 2A, the state viewer 236' reads the I/O request state data 234' from retentive storage and writes the state data to memory arrangement 214' as data sets 240' in the same types of data structures as are used for the sets 230 of I/O request run-time data. Memory arrangement 214' may or may not be part of the same data processing system as memory arrangement 214 and processor arrangement 206 depending on implementation requirements.

In response to input user controls, the IOP debugger tool 208' reads selected I/O request saved state data 240' and displays the selected data to the user. By using the same format for both the I/O request run-time data sets 230 and the saved state data 240", one instance 208 of the IOP debugger tool be used to view the I/O request run-time data 230 while another instance 208' is used to view the I/O request saved state data 240'

Figure 3:
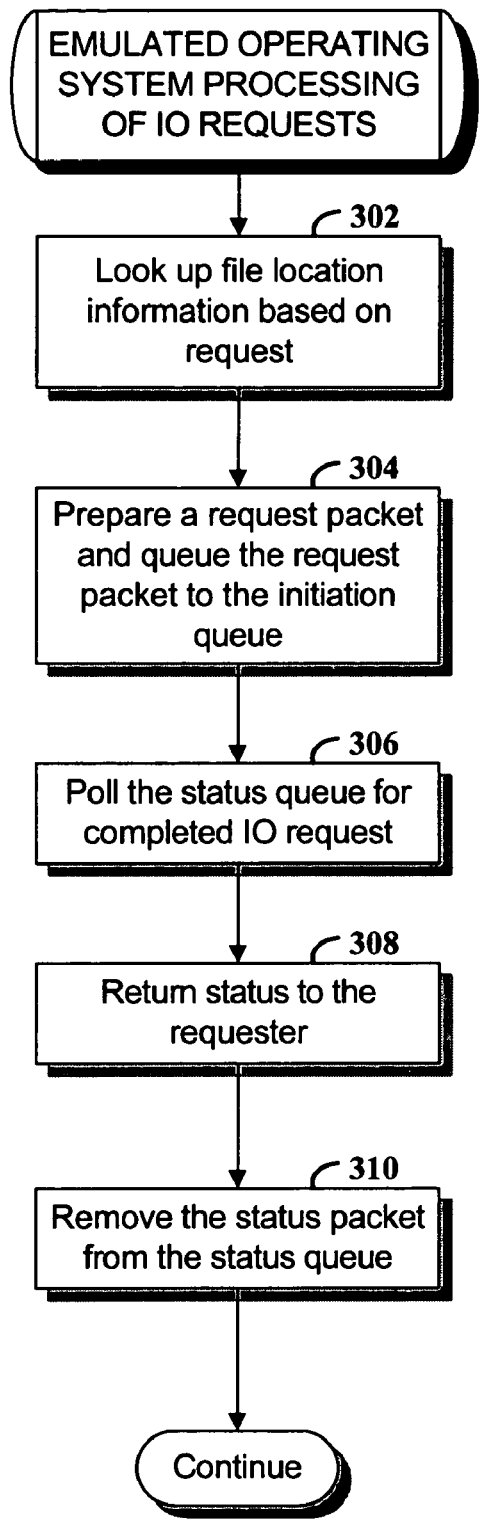
FIG. 3 is a flowchart of an example process performed by the emulated operating system in processing IO requests as related to interaction with the initiation and status queues.

FIG. 3 is a flowchart of an example process performed by the emulated operating system in processing IO requests as related to interaction with the initiation and status queues. An IO request may be submitted to the emulated operating system 210 by an emulated program 212, for example. The request may be in the form of a system call to an operating system routine. The processing of IO requests by the emulated operating 210 system and input/output processor emulator 204 as described herein is in the context of the OS 2200 operating system and an IOP of a 2200 series data processing system from Unisys. It will be appreciated, however, that the embodiments described herein may be adapted for use with different data processing system architectures.

Based on the name of the file that is provided in the system call, the emulated operating system obtains information that indicates the particular device on which the file is stored (step 302). An operating system typically maintains this information in various file management structures. The emulated operating system then prepares an IO request packet and queues the packet to the initiation queue 222 (step 304). An IO request packet may include information for addressing the device on which the referenced file data is stored or to be stored, a quantity of data to be transferred, and a user's memory address to which read data is to be returned or from which write data is to be transferred. The initiation queue 222 contains a set of IO request packets to be processed by the input/output processor emulator.

The emulated operating system also polls the status queue 224 for completed IO requests (step 306). The status queue contains status packets prepared by the input/output processor emulator after completing processing of a request. When a status packet appears on the status queue, the emulated operating system returns the status to the requester (step 308) and removes the status packet from the status queue (step 310). The emulated operating system may then continue with other processing.

Figure 4:
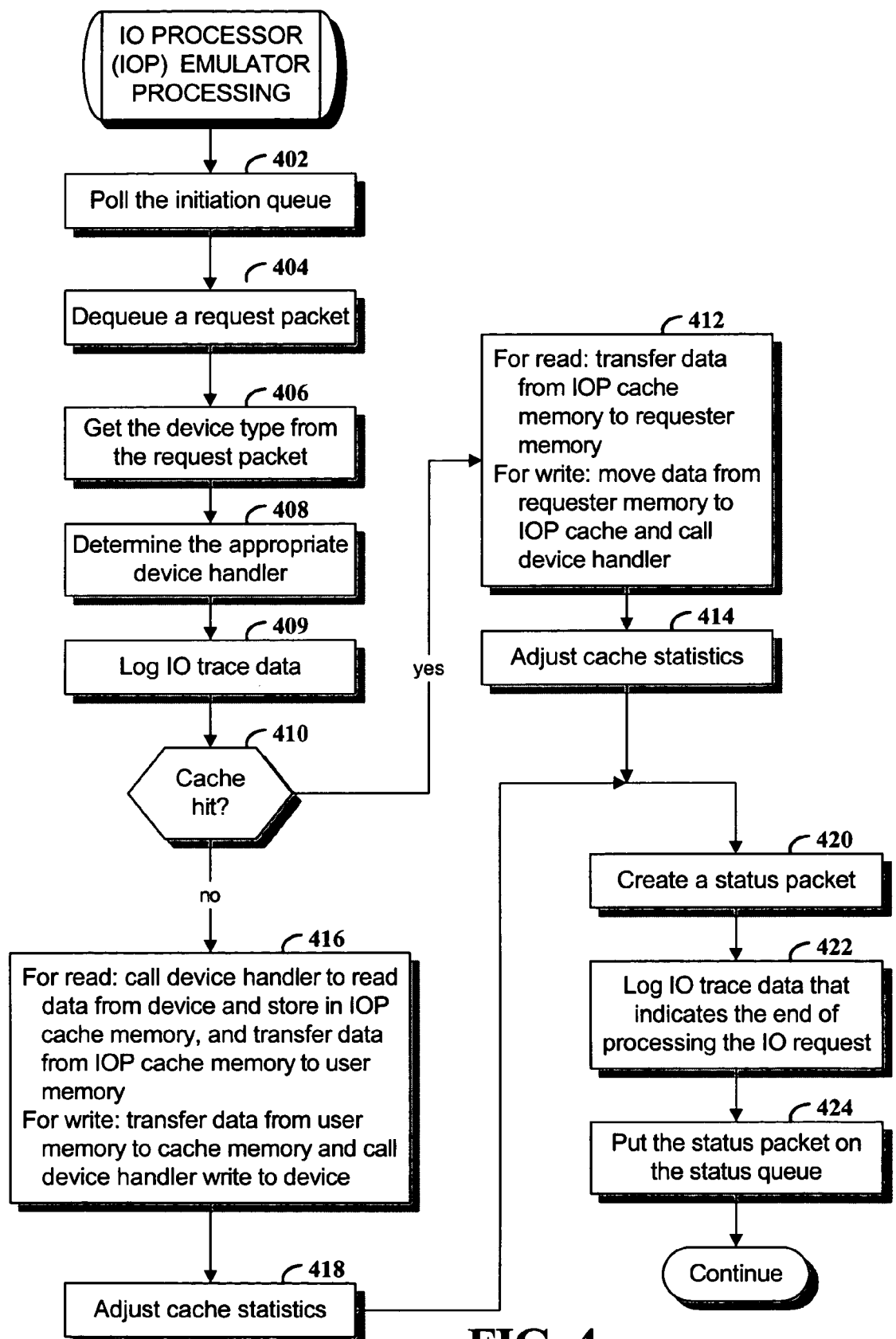
FIG. 4 is a flowchart of an example process performed by the IOP emulator in processing IO requests in accordance with various embodiments of the invention.

FIG. 4 is a flowchart of an example process performed by the IOP emulator in processing IO requests in accordance with various embodiments of the invention. The IOP emulator 204 polls the initiation queue 222 (step 402) for request packets placed by the emulated operating system 210. When a request packet appears on the initiation queue, this packet at the head of the queue is dequeued (step 404).

The type of device that is addressed by the IO request is obtained from the request packet (step 406), and the appropriate device handler is determined according to the device type (step 408). At step 409, the IOP emulator logs IO trace data 228 to indicate the beginning of processing the IO request.

Figure 10:
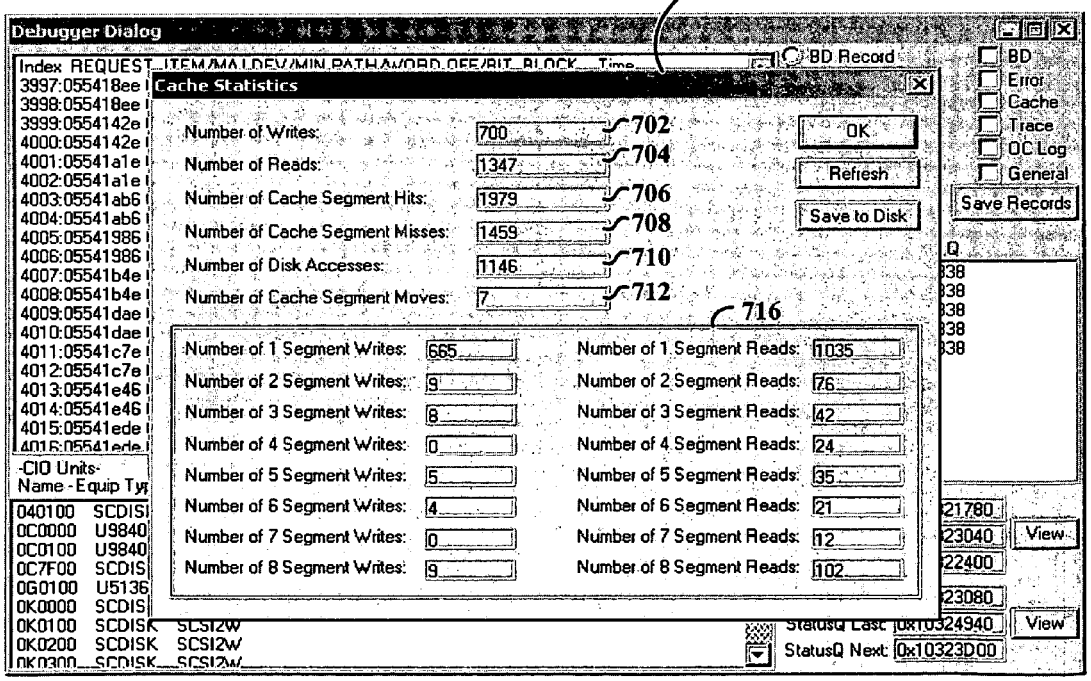
FIG. 10 is an example of a dialog window that displays cache statistics accumulated by the IOP emulator in accordance with various embodiments of the invention.

If the address referenced by the request is present in the IOP cache 226, for a read request the IOP emulator 204 transfers the data from the IOP cache 226 to the requester's designated memory area (step 412). For a write request, the IOP emulator writes data from the requester's memory area to the IOP cache and calls the device handler to write the data to the device. The cache statistics are then adjusted accordingly. Example statistics include the numbers of write requests, read requests, cache hits, and cache misses. Further example statistics are illustrated in FIG. 10.

If the address referenced by the request is not present in the IOP cache 226, for a read request the IOP emulator 204 calls the device handler to read data from the device and transfer the data to the requester's memory space (step 416). For a write request, the data is transferred to the IOP cache and the device handler is called to write the data to the device. At step 418, the cache statistics are adjusted to reflect the processing of the IO request and the cache miss. It will be appreciated that the IOP emulator performs additional cache management functions when reading and writing data, for example, selecting data for replacement by newly cached data.

When the processing of the IO request is complete, the IOP emulator 204 creates a status packet (step 420). The status packet may indicate the success or failure of processing the request, for example. The IOP emulator also logs information that indicates completion of processing the IO request (step 422). This information is logged as IO trace information 228. The status packet is then enqueued on the status queue (224) for processing by the emulated operating system 210 (step 424). The IOP emulator may then continue with other processing related to IO requests.

Figure 5A:
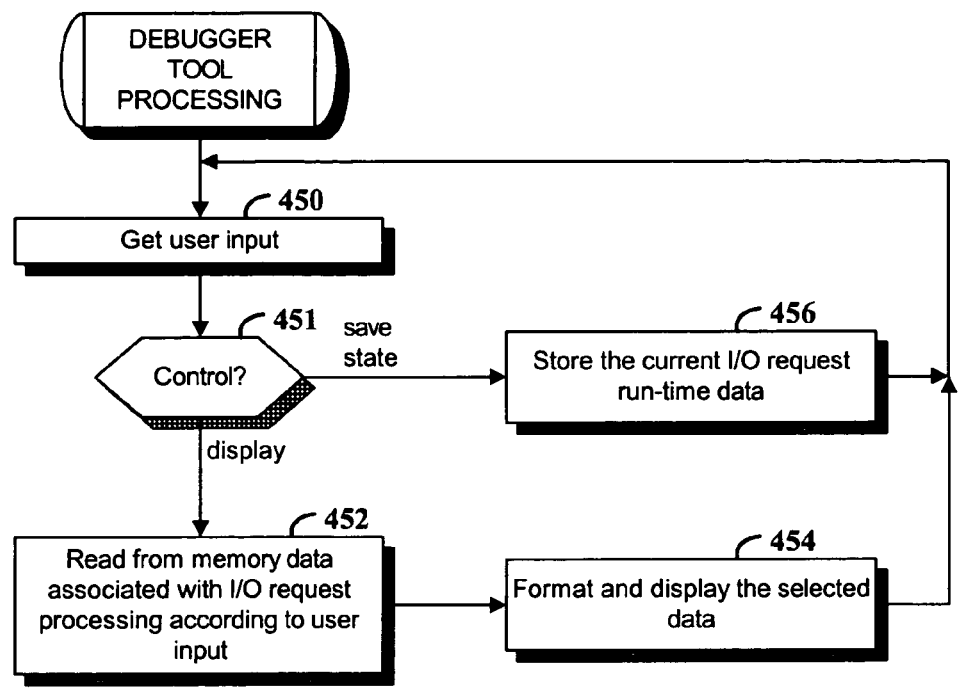
FIG. 5A is a flowchart of an example process performed by an IOP debugger tool in accordance with various embodiments of the invention.
Figure 6:
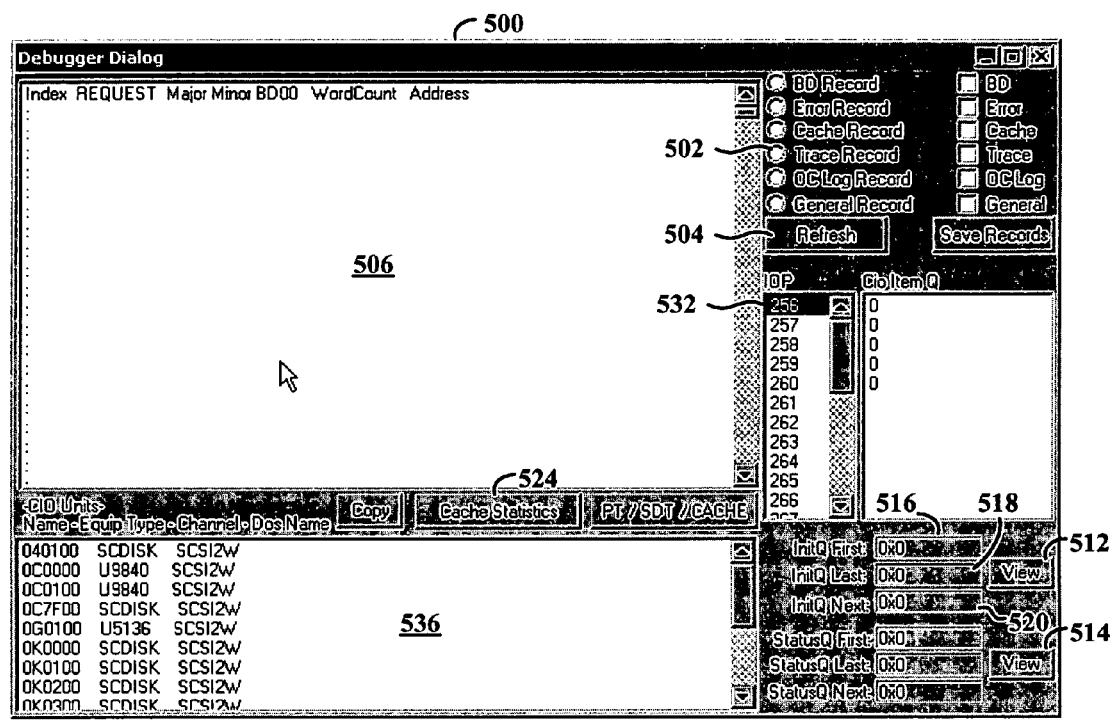
FIG. 6 is an example of a user interface window provided by the IOP debugger in accordance with various embodiments of the invention.

FIG. 5A is a flowchart of an example process performed by an IOP debugger tool 208 in accordance with various embodiments of the invention. User input generally controls the actions taken by the debugger tool 208 (step 450). For example, if the input user control (decision step 451) is for displaying I/O request run-time data, the debugger tool reads from memory selected data that is associated with IO request processing (step 452), and formats and displays the selected data (step 454). An example of an IOP debugger user interface window 500 for obtaining user input is illustrated in FIG. 6. Examples of data that is associated with IO request processing by an IOP emulator include trace information 228 associated with each IO request (also FIG. 7), the contents of the initiation queue 222 (also FIG. 8), the contents of the status queue 224 (also FIG. 9), and statistics associated with management of IOP cache 226 (also FIG. 10).

If the input user control is for saving the current I/O request run-time data ("save state"), then the debugger tool stores the current I/O request run-time data (step 456). It may be recalled that in an alternative embodiment (FIG. 2B), a system support program 252 saves the state data in response to a problem detected during emulation. In that alternative embodiment, the IOP debugger tool 208 may be implemented without process steps for storing the current state data.

Figure 5B:
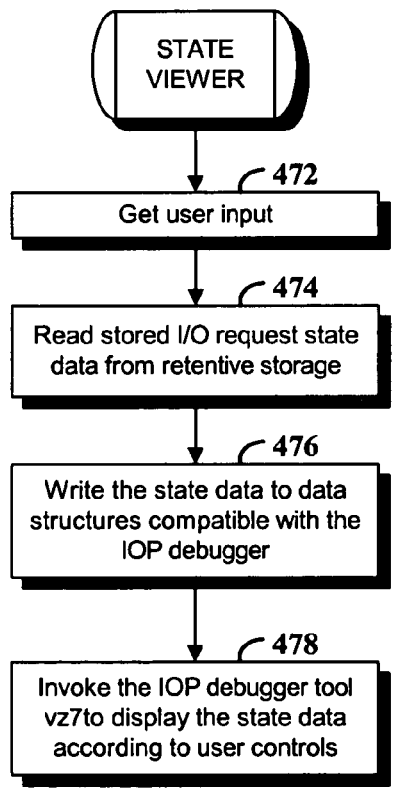
FIG. 5B is a flowchart of an example process performed to view saved IOP state information in accordance with various embodiments of the invention.

FIG. 5B is a flowchart of an example process performed to view saved IO request state data 234 in accordance with various embodiments of the invention. In response to user input control (step 472), the process reads the stored I/O request state data from retentive storage (step 474) and writes the data to data structures that are compatible with the IOP debugger tool 208 (step 476). For example, the data structures may be of the same type as those used for the I/O request run-time data 220).

After writing the stored I/O request state data to memory, the state viewer then invokes the IOP debugger 208 (step 478). The IOP debugger tool displays selected state data according to input user controls.

FIGS. 6–10 illustrate various user interface windows and dialog windows used in the user interface and include example data. It will be appreciated that the example data should be understood to be I/O request saved state data 242 if the IOP debugger tool is invoked via the state viewer 234 or I/O request run-time data 229 if the IOP debugger tool is instructed to reference the I/O request run-time data.

FIG. 6 is an example of a user interface window 500 provided by the IOP debugger tool 208 in accordance with various embodiments of the invention. Through window 500 the IOP debugger tool 208 allows a user to selectively view IO request trace 228 information, contents of the initiation queue 222, contents of the status queue 224, IOP cache 226 statistics and an assortment of other information associated with processing of IO requests by the IOP emulator. While not shown, it will be appreciated that the user interface window 500 may be modified to provide a function for saving state information as described above.

Trace information related to processing of IO requests may be selected with the Trace Record selector button 502 and Refresh button 504. The trace data from I/O trace 228 is displayed in trace data box 506. When the user selects button 502 and thereafter selects the Refresh button 504, the current IO trace information 228 is displayed in box 506. Each time the user selects the Refresh button, box 506 is updated with the most recent IO trace information. It will be appreciated that the Refresh button may be deactivated when processing the I/O request saved state data 242 to indicate that the state data will not change as would the run-time data 229.

The contents of the initiation queue 222 may be viewed (FIG. 8) by selecting the View button 512, and the contents of the status queue may be viewed (FIG. 9) by selecting the View button 514. Window 500 also indicates the values of the pointers used to maintain the circular-queue data structures that implement the initiation queue 222 and status queue 224. For example, the values of the first, last, and next pointers 516, 518, and 520, respectively, are shown for the initiation queue. Comparable pointers are maintained for the status queue.

The user may view cache statistics (FIG. 10) by selecting the Cache Statistics button 524. In one embodiment, a separate window is opened to display information such as the numbers of read and write requests and the numbers of cache hits and misses.

In a system that emulates multiple IOPs, in one embodiment the user may select an IOP for which related data is displayed via the IOP selector box 532. Each emulated IOP 204 has its own IO trace data, initiation and status queues, and associated IOP cache. The IOP debugger tool 208 selects the data to display based on the IOP specified in the IP selector box 532 along with the other user-selected buttons.

Device information box 536 indicates the names, types and channel identifiers of the IO devices configured in a system. This information may be useful in correlating with the IO trace information (FIG. 7).

Figure 7:
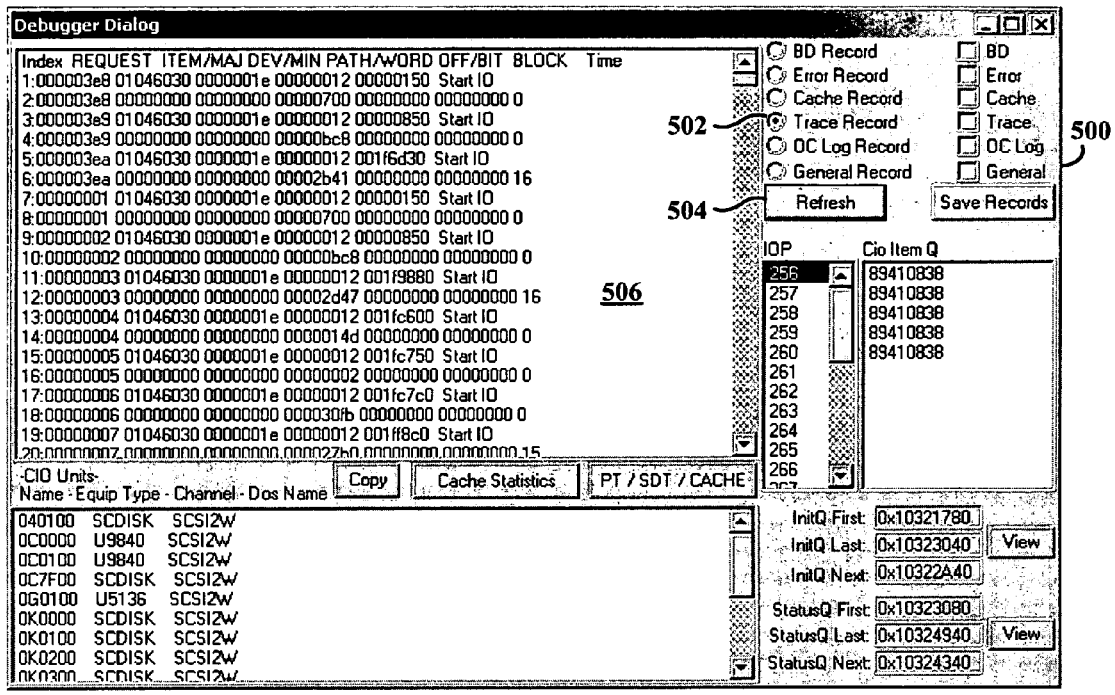
FIG. 7 is an example of a user interface window in which IO trace data is displayed in accordance with various embodiments of the invention.

FIG. 7 is an example user interface window 500 in which IO trace data is displayed in accordance with various embodiments of the invention. The IO trace data may be displayed by selecting the Trace Record button 502 and then the Refresh button 504.

Each entry of IO trace data is displayed in two lines with each line having an Index number. The data in each entry, as illustrated by the column headings, include: REQUEST, ITEM/MAJ, DEV/MIN, PATH/WORD, OFF/BIT, BLOCK, and Time.

REQUEST—REQUEST is short for request identifier, which comes from the initiation queue 222 entry and is used to identify the IO request. The request identifier is returned in the status queue 224 entry to indicate to the operating system which IO request has completed.

ITEM/MAJ—ITEM is the address of the IOP emulators's work buffer which is used to process the 10 request. This address is logged when the IO request starts. MAJ is short for Major Status, which is logged and returned in the IO request packet when the IO request completes. A non-zero Major Status indicates an error has occurred. The value indicates what type of error has occurred.

DEV/MIN—DEV is short for device identifier, which indicates the device to which an IO request is to be performed and is logged when the IO request starts. MIN is short for Minor Status, which is used to further define an error that was reported as Major Status.

PATH/WORD—PATH is the identifier of the path used to access the device specified by the device identifier. PATH is logged when the IO request starts. WORD is the number of words that were transferred as the result of the IO request and is logged when the IO completes.

OFF/BIT—OFF is short for offset, which is the offset (address) at which to begin reading or writing on the device. OFF is logged when the IO request starts. BIT is the number of bits transferred after the last full WORD that was transferred. It specifies that a partial word was transferred. BIT is logged when the IO completes.

BLOCK—BLOCK specifies the number of blocks transferred for IO requests to a tape drive. Tape blocks have a variable length, and therefore, the number of blocks cannot be calculated from the WORD count. BLOCK is logged when the IO request completes.

Time—Time specifies the amount of time in milliseconds of how long an IO request takes to complete. Some IO requests may complete in under 1 millisecond.

Figure 8:
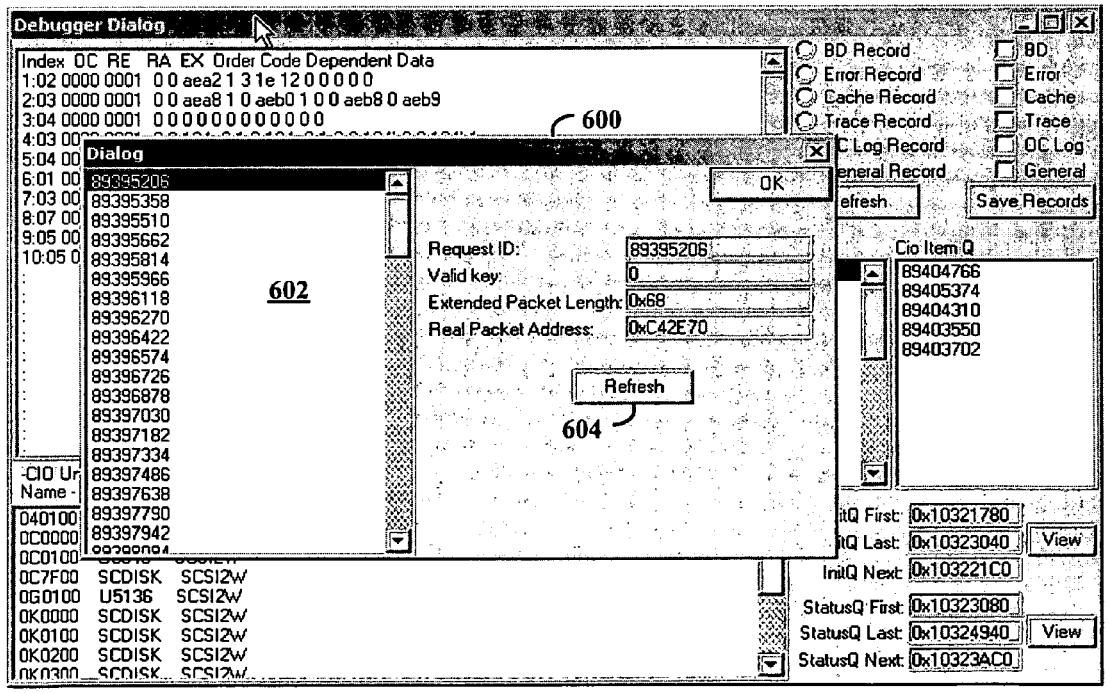
FIG. 8 is an example of a dialog window that displays information pertaining to the initiation queue in accordance with various embodiments of the invention.

FIG. 8 is an example of a dialog window 600 that displays information pertaining to the initiation queue 222 in accordance with various embodiments of the invention. The identifiers of the IO requests (Request ID) in the initiation queue are displayed in box 602, with further information associated with a selected IO request being displayed in information boxes.

Valid key is a flag set by the operating system to indicate that this initiation queue 222 entry is valid and the IOP should process the IO request. The IOP will clear this flag to indicate that it has begun processing the request. The initiation queue entry can be reused by the OS when the Valid key has been cleared by the IOP. For the Valid key in the status queue entry, the opposite occurs. The IOP sets the Valid key to 1 to indicate that the status is valid. The operating system clears the flag to indicate that it has processed the status queue entry.

At the end of the IO packet there is a variable amount of space that may be used by the IOP to return additional information about an IO request. The Extended Packet Length indicates how large of an area follows the IO packet for this purpose. An example would be that if the IO request fails, the IOP can return the SCSI sense information supplied by the device. This sense information contains additional information on why the device failed.

The Real Packet Address is the address of the IO request packet. It is the real address recognized by the OS. In one embodiment, this address is emulated and must be manipulated to determine the virtual address that is used by the IOP to access the IO request packet.

The Refresh button 604 may be used to update the contents of box 602 with the most recent contents of the initiation queue 222.

Figure 9:
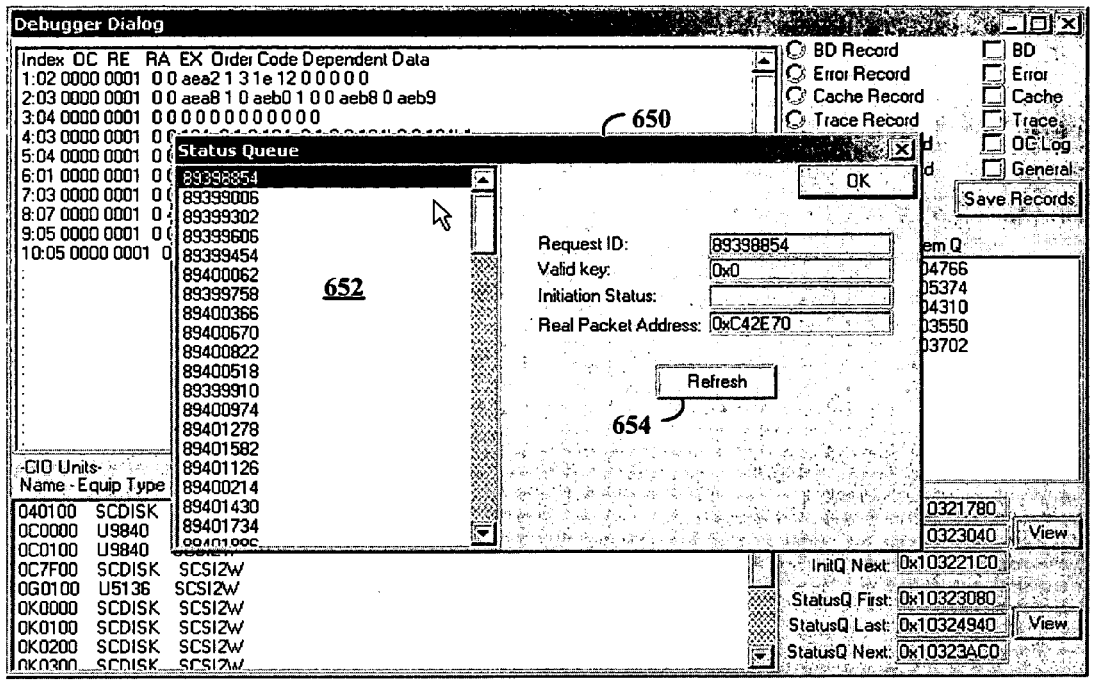
FIG. 9 is an example of a dialog window that displays information pertaining to the status queue in accordance with various embodiments of the invention.

FIG. 9 is an example of a dialog window 650 that displays information pertaining to the status queue 224 in accordance with various embodiments of the invention. The identifiers of the IO requests (Request ID) in the status queue are displayed in box 652, and further information associated with a selected IO request being displayed in information boxes. The Valid key and Real Packet Address have the same meanings as for entries in the initiation queue as described above in association with FIG. 8.

In one embodiment, the Initiation Status having a value of 0 indicates that no errors occurred processing the initiation queue entry. A value of 1 indicates that the Real Packet Address was invalid.

The Refresh button 654 may be used to update the contents of box 652 with the most recent contents of the status queue 224.

FIG. 10 is an example of a dialog window 700 that displays cache statistics accumulated by the IOP emulator 204 in accordance with various embodiments of the invention. In one embodiment, the statistics are accumulated from the time that an IOP is activated in the system, for example system boot time, until the IOP is made unavailable for use in the running system or the system is rebooted.

The cache statistics include metrics related to managing the IOP cache 226 in processing IO requests. The numbers of IO writes and IO reads are displayed in boxes 702 and 704, respectively. The numbers of hits and misses to the cache are displayed in boxes 706 and 708, respectively. The number of IO requests that reference a disk device is displayed in box 710.

The cache statistics further include a metric that tracks the number of cache segment moves, which is displayed in box 712. This metric indicates the number of segments that have been moved to form a contiguous block of data for transfer to disk.

The cache statistics contain further metrics that indicate the size of data transfers of the IO requests. The metrics are maintained for both read and write operations. In the illustrated embodiment, metrics are maintained for transfers ranging in size from 1 segment to 8 segments as shown in section 716 of window 700.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for analyzing operations of an emulated input-output processor (IOP), comprising:

emulating instructions native to a first type of instruction processor on a second-type instruction processor;

executing by an instruction processor emulator an operating system including instructions native to the first type of instruction processor, and including instructions that write input/output (IO) requests to a memory arrangement in response to IO functions invoked by a program;

emulating IOP processing of IO requests with an IOP emulator executable on the second-type processor, including processing IO requests from the memory arrangement and maintaining in the memory arrangement a first set of data structures used in processing the IO requests;

storing state data currently contained in the data structures on a retentive storage device; and reading state data from the retentive storage responsive to a user input control and displaying the data.

2. The method of claim 1, further comprising:

writing the state data read from retentive storage in a second set of data structures that are of the same type as the first set of data structures reading selected data from the second set of structures responsive to user-input controls and displaying the selected data.

3. The method of claim 1, wherein the selected data include data that describe each IO request.

4. The method of claim 1, further comprising:
maintaining a cache of data from a storage device by the IOP emulator; and
accumulating statistics describing management of the cache, wherein the selected data include the statistics describing management of the cache.

5. The method of claim 4, wherein the selected data include respective numbers of read requests and write requests.

6. The method of claim 5, wherein the selected data include respective numbers of cache hits and cache misses.

7. The method of claim 6, wherein the selected data include respective numbers of read requests of different sizes and respective numbers of write requests of different sizes.

8. The method of claim 1, wherein the data structures include a first queue of in-process IO requests and a second queue of completed IO requests, and the selected data include data from the first and second queues.

9. The method of claim 1, further comprising:
emulating IOP processing of IO requests with a plurality of IOP emulators executable on the second-type processor, and each IOP emulator maintaining in the memory arrangement respective data structures used in processing IO requests directed to that IOP emulator;
wherein the selected data include data from the data structures associated with an IOP emulator in response to a user-selected IOP emulator.

10. An apparatus for analyzing operations of an emulated input-output processor, comprising:
means for emulating instructions native to a first type of instruction processor on a second-type instruction processor, the instructions including operating system instructions that write input/output (IO) requests to a memory arrangement in response to IO functions invoked by a program;
means for emulating on the second-type processor, IOP processing of IO requests from the memory arrangement and maintaining in the memory arrangement a first set of data structures used in processing the IO requests;
means for storing state data currently contained in the data structures on a retentive storage device; and
means responsive to a user input control for reading state data from the retentive storage and displaying the state data.

11. The apparatus of claim 10, further comprising:
means for maintaining a cache of data from a storage device by the means for emulating IOP processing of IO requests; and
means for accumulating statistics describing management of the cache, wherein the selected data include the statistics describing management of the cache.

12. A processor-implemented method for analyzing operations of an emulated input-output processor, comprising:
emulating instructions native to a first type of instruction processor on a second-type instruction processor;
executing by an instruction processor emulator, an operating system including instructions native to the first type of instruction processor, the operating system including instructions that write input/output (IO) requests to a memory arrangement and read input data from the memory arrangement in response to IO functions invoked by a program;
emulating IOP processing of IO requests with an IOP emulator executable on the second-type processor, including processing IO requests from the memory arrangement and maintaining in the memory arrangement a first set of data structures used in processing the IO requests;
displaying, via a first tool, selected data from the first set of data structures in response to a user input control;
storing state data currently contained in the data structures on a retentive storage device;
reading state data from the retentive storage responsive to a user input control and writing the state data to a second set of data structures in the memory arrangement, wherein the second set of data structures are identical in structure to the first set of data structures; and
displaying, via the first tool, selected data from the second set of data structures in response to a user input control.

13. The method of claim 12, wherein the selected data from the first and second sets of data structures include data that describe each IO request.

14. The method of claim 12, further comprising:
maintaining a cache of data from a storage device by the IOP emulator; and
accumulating in the first set of data structures statistics that describe management of the cache, wherein the selected data from the first and second sets of data structures include the statistics describing management of the cache.

15. The method of claim 14, wherein the selected data from the first and second sets of data structures include respective numbers of read requests and write requests.

16. The method of claim 15, wherein the selected data include respective numbers of cache hits and cache misses.

17. The method of claim 16, wherein the selected data from the first and second sets of data structures include respective numbers of read requests of different sizes and respective numbers of write requests of different sizes.

18. The method of claim 12, wherein the first and second sets of data structures include a first queue of in-process IO requests and a second queue of completed IO requests, and the selected data from the first and second sets of data structures include data from the first and second queues.

19. The method of claim 12, further comprising:
emulating IOP processing of IO requests with a plurality of IOP emulators executable on the second-type processor, and each IOP emulator maintaining in the memory arrangement respective data structures used in processing IO requests directed to that IOP emulator;
wherein the selected data from the first and second sets of data structures include data from the data structures associated with an IOP emulator in response to a user-selected IOP emulator.

* * * * *